United States Patent [19]

Kashio

[11] 3,959,780

[45] May 25, 1976

[54] CONTROL DEVICE FOR PRINTING APPARATUS

[75] Inventor: Toshio Kashio, Tokyo, Japan

[73] Assignee: Casio Computer Co., Ltd., Tokyo, Japan

[22] Filed: Apr. 9, 1975

[21] Appl. No.: 566,457

Related U.S. Application Data

[63] Continuation-in-part of Ser. No. 245,074, April 18, 1972, abandoned.

[30] Foreign Application Priority Data

Apr. 20, 1971 Japan .................................... 24901

[52] U.S. Cl. ............................................. 340/172.5

[51] Int. Cl.² .......................................... G06F 13/00

[58] Field of Search .................... 340/172.5; 197/19; 235/151, 151.1

[56] References Cited

UNITED STATES PATENTS

| | | | |
|---|---|---|---|
| 3,351,917 | 11/1967 | Shimabukuro | 340/172.5 |
| 3,478,325 | 11/1969 | Beters et al. | 340/172.5 |
| 3,571,808 | 2/1971 | Washizuka et al. | 340/172.5 |
| 3,588,833 | 6/1971 | Bartlett et al. | 340/172.5 |
| 3,611,303 | 10/1971 | Serrachioli et al. | 340/172.5 |
| 3,613,082 | 10/1971 | Bouchard | 340/172.5 X |
| 3,662,346 | 5/1972 | Tada | 340/172.5 |

*Primary Examiner*—Joseph F. Ruggiero
*Attorney, Agent, or Firm*—Allison C. Collard

[57] ABSTRACT

An electric control device for printing apparatus in which electric signals, representing letters and the positions of words formed by the letters, are transmitted from a keyboard to storage means in which the signals are stored in their sequence of generation. The storage means includes two one-character, seven-bit dynamic shift registers, coupled in series, through which the signals are shifted. A typewriter printing mechanism is coupled to the storage means, and it prints the stored text word by word, each formed by the letters represented by the signals stored in the storage means. A control unit coupled to the printing means, keyboard and storage means controls the input of the signals to the storage means, and the read-out and printing of the signals by the printing means, so that the signals are transmitted into and out of the storage means and printed word by word in the sequence in which they were generated.

3 Claims, 79 Drawing Figures

Ø1

Ø2

Øk

CHARACTER SIGNAL
B

KEY COMMON

OUTPUT (115)

OUTPUT (116)

OUTPUT (119)

121Q̄

OUTPUT (124)

OUTPUT (125)

OUTPUT (126)

OUTPUT (127)

OUTPUT (122)

OUTPUT (117)

OUTPUT (118)

OUTPUT (120)

OUTPUT (12)
0
1

Ø1

Ø2

ØK

ØA

EO

REGISTER 13
A
B
SPACE

REGISTER 15
A
B
SPACE

OUTPUT (202)

OUTPUT (201)

OUTPUT (204)

OUTPUT (205)

ØB (210)

OUTPUT (203)

212Q

OUTPUT (213)

211Q

OUTPUT (208)

OUTPUT (209)

OUTPUT (206)

Ø1
Ø2
Øk
ØA
E0
REGISTER 13
REGISTER 15
A
B
SPACE
OUTPUT (202)
OUTPUT (201)
OUTPUT (204)
OUTPUT (205)
ØB (210)
OUTPUT (203)
212Q
OUTPUT (213)
211Q
OUTPUT (208)
OUTPUT (209)
OUTPUT (206)
0
1

CONTROL DEVICE FOR PRINTING APPARATUS

U.S. Pat. application

This is a continuation-in-part application of the applicant's earlier pat. applicatioon Ser. No. 245,074, filed Apr. 18, 1972, titled "Printing Apparatus," now abandoned.

The present invention relates to a control device for a printing apparatus, and in particular to an electric typewriter for printing words and alpha-numeric characters word by word in response to a predetermined sequence of selected electric signals.

Conventional typewriting apparatus, including keypunch typewriters used to type input and output data for electronic computers, are designed to print alphanumeric characters one after another each time the keys of the control keyboard are depressed. However, when the wrong key is depressed, such typewriters immediately print the incorrect character, making the mistake difficult to correct. Furthermore, since it is impossible for the machine to print at a higher rate of speed than that for which the printing mechanism was designed, if the keyboard is operated at a speed greater than its designed work speed, the mechanism will not print all the characters, and may be mechanically damaged. Moreover, the keyboard operation cannot be continued during the return of the typewriter carriage.

It is accordingly the object of the invention to provide a control device for a more convenient typewriter which overcomes the above disadvantages and is capable of high-speed printing. Accordingly, the present invention provides a printing apparatus, and a suitable control device therefor, which latter comprises means for generating and feeding alphanumeric character signals and word positioning signals into the printing apparatus in the sequence in which they are generated; means for storing the signals in the printing apparatus in the sequence in which the signals are generated; and means for printing the text by words, represented by the signals in the same sequence in which the signals are generated.

In the printing apparatus controlled by the device of the present invention, the character signals transmitted by the keyboard are first stored in a memory device or dynamic shift register, without print-out, so that when the wrong key is depressed, its corresponding electrical signal can be eliminated from the memory device before printing, and even when the keyboard is operated rapidly, printing is eventually carried out without any interference.

In accordance with important features of the invention, it relates to a printing control device for a printing apparatus, comprising, in combination: input means for feeding character signals and word positioning signals to distinguish one word from another, each word being constituted by at least one character signal; memory means coupled to the input means for storing the character signals in the same predetermined order as they are applied to the input means; means for detecting the word positioning signals each time they are fed from the input means; control means for reading out the character signals from the memory means word by word, in response to the detected word positioning signals in the same order as they are stored in the memory means; printer driving means driven by the outputs fed from the detecting means; and printer means driven by the driving means for printing word by word, including in each word the characters corresponding to the respective character signals read out by the control means in the predetermined order.

Further, optional features of the inventive control device relate to a dynamic shift register included in the memory means, itself having a plurality of memory units, each of which has a memory capacity of one character, forming a circular loop, and storing the character signals in series; and wherein the control means includes a detector which detects the first one of the character signals stored in series in the memory means by selectively sensing the presence and absence of the character signals at both of any two adjacent ones of the memory units, and means for eliminating, after completion of the character printing, the character signals that have been detected by the detector and read out from the memory means.

Defined in somewhat different terms, the inventive printing control device for a printing apparatus comprises:

input means for feeding character signals and word positioning signals to distinguish one word from another, each word being constituted by at least one character signal, as stated before, memory means coupled to the input means for storing the character signals and the word positioning signals in the same predetermined order as they are applied to the input means; coupled to the memory means for detecting the word positioning signals each time they are fed to the memory means; control means for reading out the character signals word by word, in response to the word positioning signals, the control means including means for reading out the character signals from the memory means in the same order as they are stored in the memory means, and means for eliminating the character signals in the same order as they are read out from the memory means; printer driving means driven by the outputs fed from the control means; and printer means driven by the driving means for printing word by word, including in each word the characters corresponding to the respective character signals read out by the control means in the predetermined order.

Other objects and features of the present invention will become apparent from the following detailed description taken in connection with the accompanying drawings which disclose several exemplary embodiments of this invention. It is to be understood, however, that the drawings are designed for the purposes of illustration only, and are not intended as a definition of the limits and scope of the invention.

In the drawings, wherein similar reference numerals denote similar elements throughout the several views.

Figure 1:
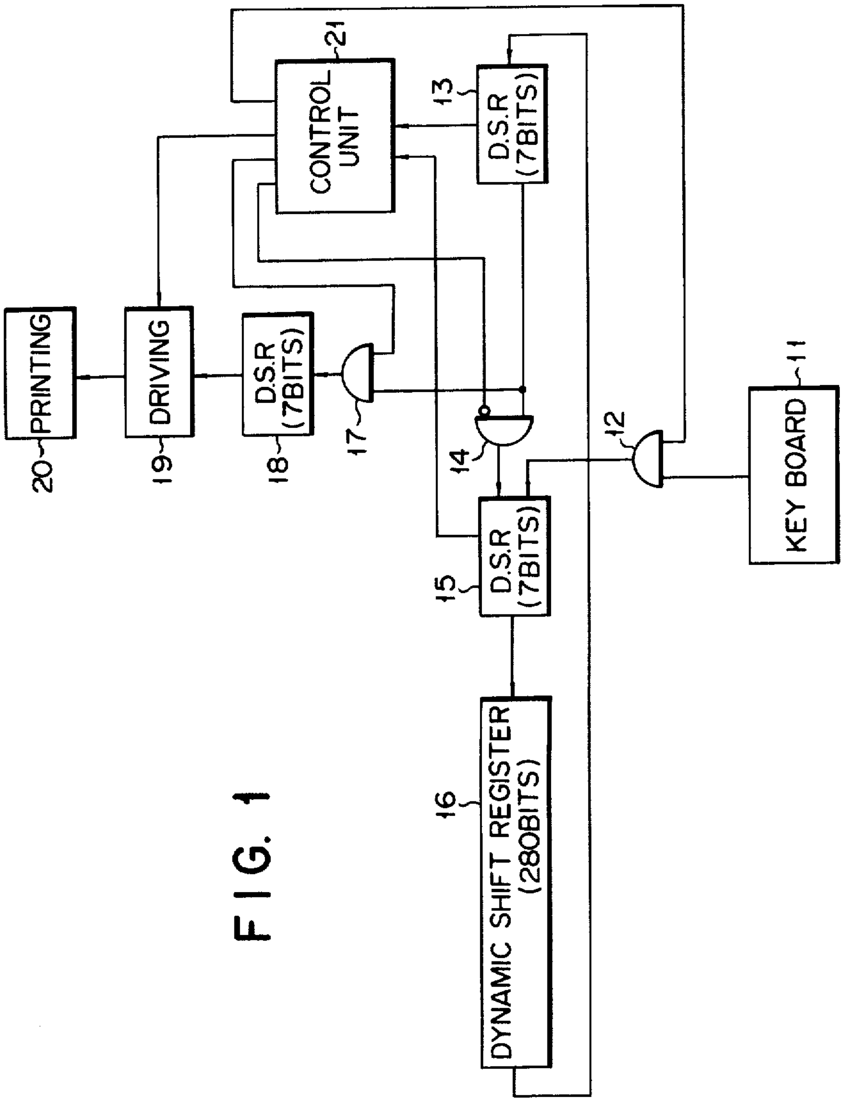
FIG. 1 is a block diagram of a control device for a printing apparatus, constructed in accordance with the present invention.

Referring to the drawings, in particular FIG. 1, a keyboard 11 generates electrical signals representing alphanumeric characters, notations such as punctuation marks, and instructions (hereinafter simply referred to as "character singals"). In the illustrated exemplary embodiment, the character signals, which are each formed of a 7-bit binary code, are supplied through an AND gate 12 to a first dynamic shift register 15 having a capacity of seven bits, or one character. The output terminal of register 15 is connected to the input terminal of another dynamic shift register, 16, having a capacity of 280 bits or 40 characters, whose output terminal is connected to the input terminal of a third dynamic shift register, 13, having a capacity of 7 bits or one character.

The output terminal of register 13 is connected to register 15 through an inhibit gate 14. Accordingly, the character signals supplied to register 15 are progressively shifted while being circulated through shift registers 15, 16 and 13 in the direction of the indicated arrows, and are stored by the three shift registers which function as a memory unit.

A control unit 21 controls the timing of storing the character signals transmitted by keyboard 11 to register 15 through AND gate 12, causing memory units 15, 16, 13 to store the character signals in the sequence in which they are generated by keyboard 11. Upon depression of the spacebar or tabulation key after the storage of such a series of character signals, other character signals representing a "space" or a "tab", or those designating the return of the typewriter mechanism (sometimes defined as a "carrier" or "carriage"), are transmitted to registers 15, 16, 13, thus completing the storage of one word therein. As used herein, the character signals denoting the space, tab and "return" instructions are collectively referred to as "word-positioning signals."

When the word-positioning signals are transmitted to registers 15, 16, 13, and detected by a separate means, illustrated and discussed later on herein, control unit 21 activates a printing mechanism 20 by a typewriter drive circuit or unit 19 to print the words represented by the character signals stored in a dynamic shift register 18 (also covering seven bits). Such registers are conventionally identified as "DSR," for the designation dynamic shift register. Register 18 stores the first one of the series of character signals stored in registers 15, 16, 13. This first signal is transmitted to register 18 through an AND gate 17 under control of unit 21.

When the letter represented by the first character signal stored in register 18 is printed, control unit 21 actuates an inhibit gate 14 to clear the character signal from registers 15, 16, 13. The second one of the series of character signals constituting a word is then transmitted to register 18 for printing and thereafter cleared from registers 15, 16, 13 like the first character signal.

This operation is carried out sequentially to print words one after another. In each case, the respective character signals are cleared each time. When the operation of the space, tab or return signal is performed, the associated word-positioning signal is also cleared, thus stopping printing due to the absence of the word postioning signal in registers 15, 16, 13.

When a word keyboard 11 is supplied to the registers while the preceding word already stored therein is being printed in the afore-mentioned manner, a word-positioning signal associated with the succeeding word is detected by control unit 21, and printing is continued so that the following word is printed in succession to the preceding one.

Figure 2:
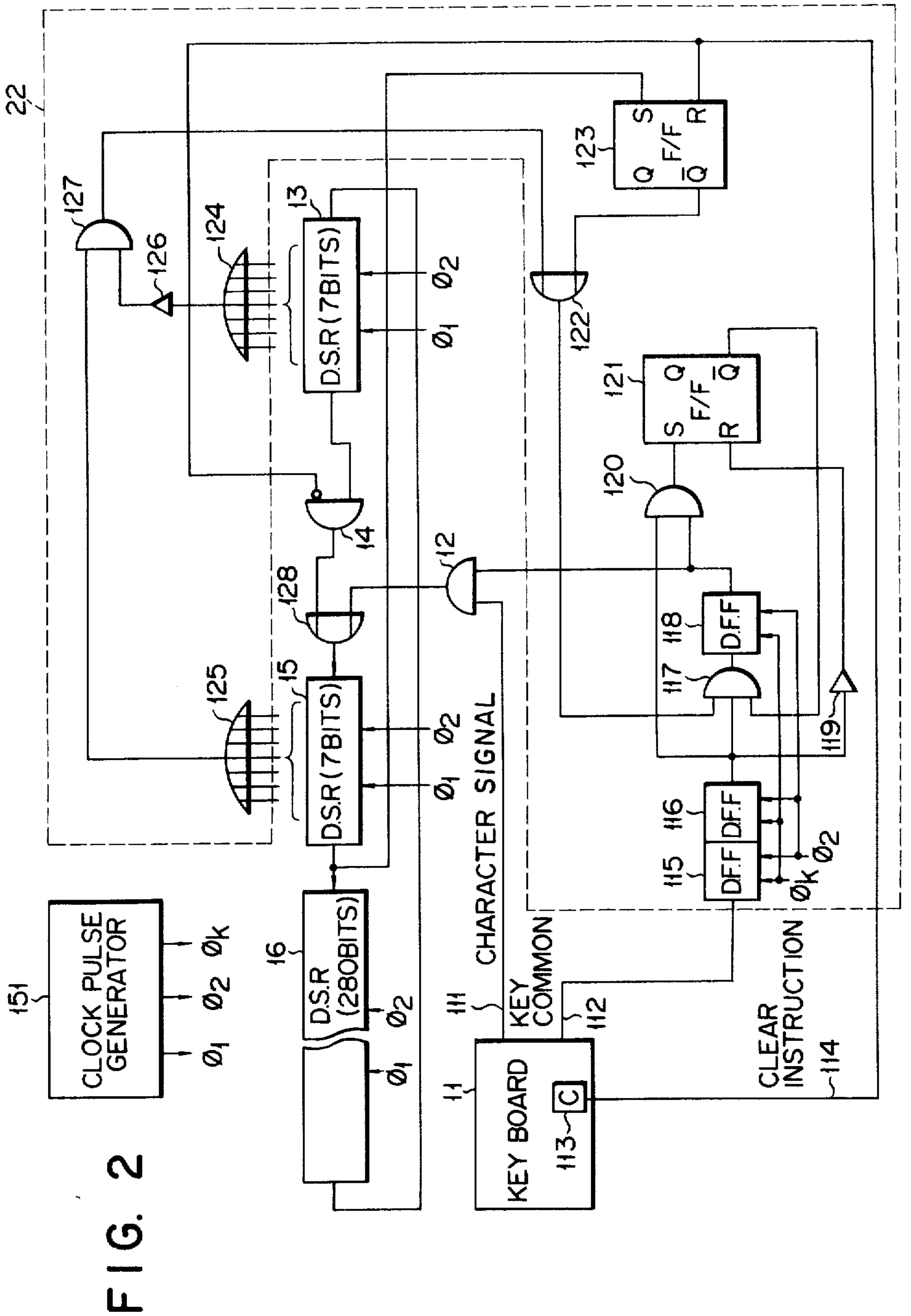
FIG. 2 is a detailed block diagram of "write-in" and "storage" portions of the printing apparatus of FIG. 1.
Figures 4A, 4B, 4C, 4D, 4E, 4F, 4G, 4H, 4I, 4J, 4K, 4L, 4M:
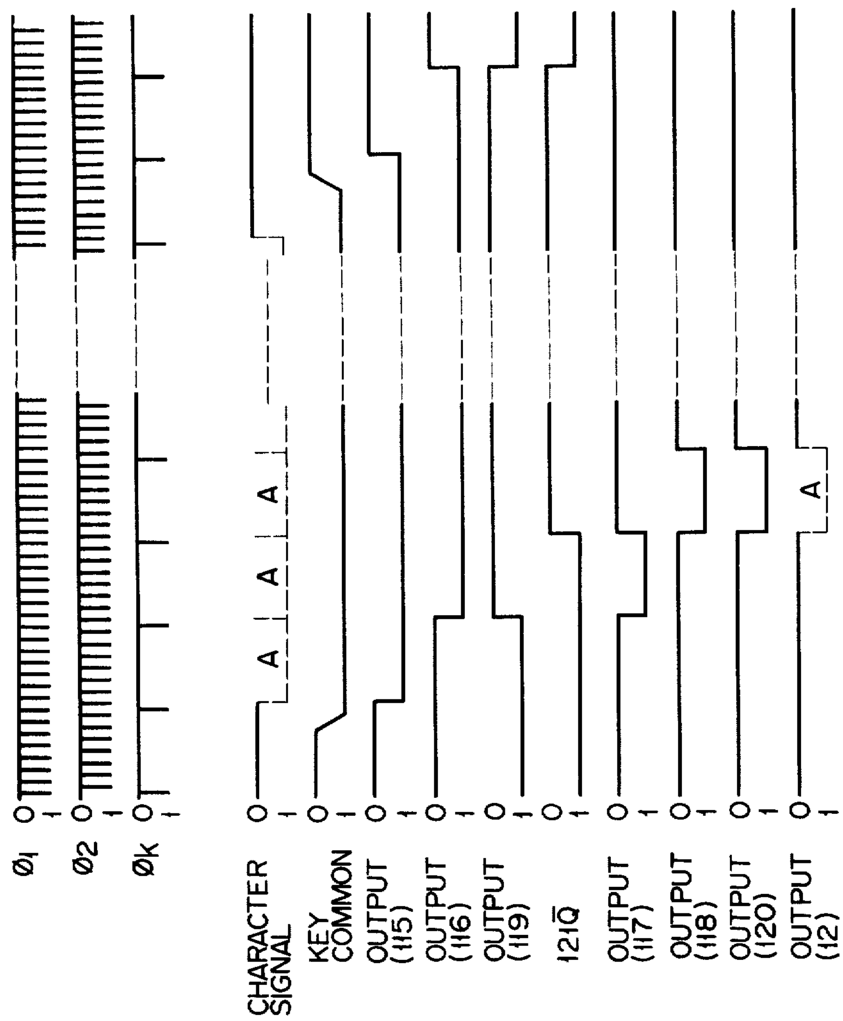
FIGS. 4A – 4M and 5A – 5R illustrate clock-pulse generator output and character signals in relation to time of the write-in and storage portions of the apparatus shown in FIG. 2.

Referring to FIG. 2, the operation of a read-in portion or unit 22 of the device of FIG. 2 is shown and described. To operate the printing mechanism, a clear key (C) 113 of keyboard 11 is actuated to generate a signal instructing "clear" which is supplied an inhibit gate 14. Also, a flip-flop circuit 123 receives by way of a transmission line 114 a reset signal at the input R to produce a "1" output signal at its terminal $\underline{0}$. The inhibit gate 14 is closed to clear registers 15, 16, 13. According to these portions of the device, the storage memory consists of serially connected shift registers 15, 16 and 13 which are dynamically shifted by a write-in clock-pulse $\phi_1$ of FIG. 4A and a read-out clock-pulse $\phi_2$ of FIG. 4B, both supplied by a clock-pulse generator 151. It will be noted that for a better understanding of the figures, the illustrations of FIGS. 4A to 4C are repeated as respective FIGS. 5A to 5C, 7A to 7C as well as 8A to 8C. However, it should be noted that the DSR's 15, 16, 13 may also be connected in parallel, and any other type may be used as long as they have the same function.

When the key of keyboard 11 bearing the letter A of the alphabet is depressed, for example, AND gate 12 receives a character signal (see FIG. 4D) representing the letter A through a transmission line 111, as shown in FIG. 2. While the A key is depressed, a key-common signal is also generated, as shown in FIG. 4E, which is produced upon depression of any key, including the A key. This key-common signal is transmitted to a delayed flip-flop circuit 115 through a transmission line 112. Clock-pulse generator 151 also transmits write-in clock-pulse $\phi_1$ and read-out clock-pulse $\phi_2$ and also a clock-pulse $\phi_k$ which is generated, as shown in FIG. 4C, each time seven clock-pulses $\phi_1$ or $\phi_2$ are generated to represent a 7-bit character.

By way of explanation it should be mentioned at this point that in keyboards and circuits of this type, a key-common line (also called "strobe" line) is connected to and actuated by each key of the keyboard. Any of the keys will generate this "common" signal in addition to the specific combination that characterizes the letter or function that is operated by the key in question. In the inventive device the key-common signal is utilized as a control signal in timing for feeding the code information associated with the depressed key into, for example, an information register or DSR.

More specifically, if the key associated with the letter A is depressed, the key-common signal is generated instantaneously when the specific "code signal" corresponding to the letter A comes out of the keyboard encoder (see FIGS. 4D, 4E). The present invention does not contemplate or use a separate key for generating the explained key-common signal which is conventional in keyboards of this type.

First delayed flip-flop circuit 115 writes in the key-common signal at the time of generation of the clock-pulse $\phi_k$, and reads out the signal at the time of generation of the clock-pulse $\phi_2$. Accordingly, an output signal is transmitted from said delayed flip-flop circuit 115, and takes the form shown in FIG. 4F. The output terminal of said flip-flop circuit 115 is connected to a second delayed flip-flop circuit 116, which generates an output signal at a time delay of up to one character, or seven bits, from the output signal transmitted by the delayed flip-flop circuit 115. Thi delayed output signal of delayed flip-flop circuit 116 is shown in FIG. 4G.

This output of said second delayed flip-flop circuit 116 is connected to the reset terminal R of a flip-flop circuit 121 through an inverter 119 which has an output as shown in FIG. 4H. It will be appreciated that reset terminals of other flip-flops are similarly designated with the letter R; outputs are marked Q and $\overline{Q}$ in a manner conventional for such computer- and logic-type circuits. Furthermore, flip-flop circuit 121 is of a value 1 from the start, as seen in FIG. 4I, at its output $\overline{Q}$.

At this time, terminal $\overline{Q}$ of a flip-flop circuit 123 is in a state to produce the signal 1 as previously described, so that an output signal from an OR gate 122 also takes the form 1. Accordingly, AND gate 117 receives three 1 input signals and generates an output signal 1. This latter signal is stored in a third delayed flipflop circuit 118 when said clock-pulse $\phi_k$ is generated, and then delivered in synchronism with read-out clock-pulse $\phi_2$ in the form shown in FIG. 4K. When said third delayed flip-flop circuit 119 produces an output signal of 1, then a character signal transmitted from keyboard 11 through line 111 passes through AND gate 12 and an OR gate 128 to DSR 15.

Figure 6A:
FIGS. 6A – 6C and 9A – 9D show the state of data stored in a dynamic shift register during operation of the printing apparatus.

At this time, an AND gate 120 receives two 1 input signals and produces a 1 output signal as shown in FIG. 4L. Accordingly, flip-flop circuit 121 is set to produce a 0 output signal, as shown in FIG. 4I, at its $\overline{Q}$ terminal, and an AND gate 117 also produces a 0 output signal as shown in FIG. 4J. The latter signal from AND gate 117 is stored in the third flip-flop circuit 118 when said clock-pulse $\phi_k$ is generated. Upon receipt of the read-out clock-pulse $\phi_2$, delayed flip-flop circuit 118 generates a 0 output signal as shown in FIG. 4K. As a result, AND gate 12 is closed, and it allows only one character signal in the form shown in FIG. 4M, representing one letter, to be transmitted to shift registers 15, 16, 13. When circuit 118 produces the 0 output signal, AND gate 120 also transmits a 0 output signal. Thus, only one of the numerous possible character signals, namely that generated during depression of the A key of keyboard 11, is stored in registers 15, 16, 13 in the position shown in FIG. 6A.

An explanation is appropriate in respect of the time required for a character signal or code generation, including the key-common signal, and the actuation of AND gate 12. No matter how fast a typewriter operator's finger moves, 20 to 30 msec are required to a single key being tapped or depressed. If the capacity of DSR 16 is 280 bits (or possibly 294, for convenience purposes), the time between the key depression and the AND gate actuation is about 7 msec at the most. This time is governed by how long the DSR takes to complete its 1-cycle operation, in conjunction with the associated registers 15 and 13.

This means that the time necessary to tap a keyboard key to obtain a single character signal is several times as long as the time between the key depression and the actuation of AND gate 12. This time relationship is maintained as shown in FIGS. 4D and 4M, and will be obvious to anyone skilled in the art.

Figures 5A, 5B, 5C, 5D, 5E, 5F, 5G, 5H, 5I, 5J, 5K, 5L, 5M, 5N, 5O, 5P, 5Q, 5R:
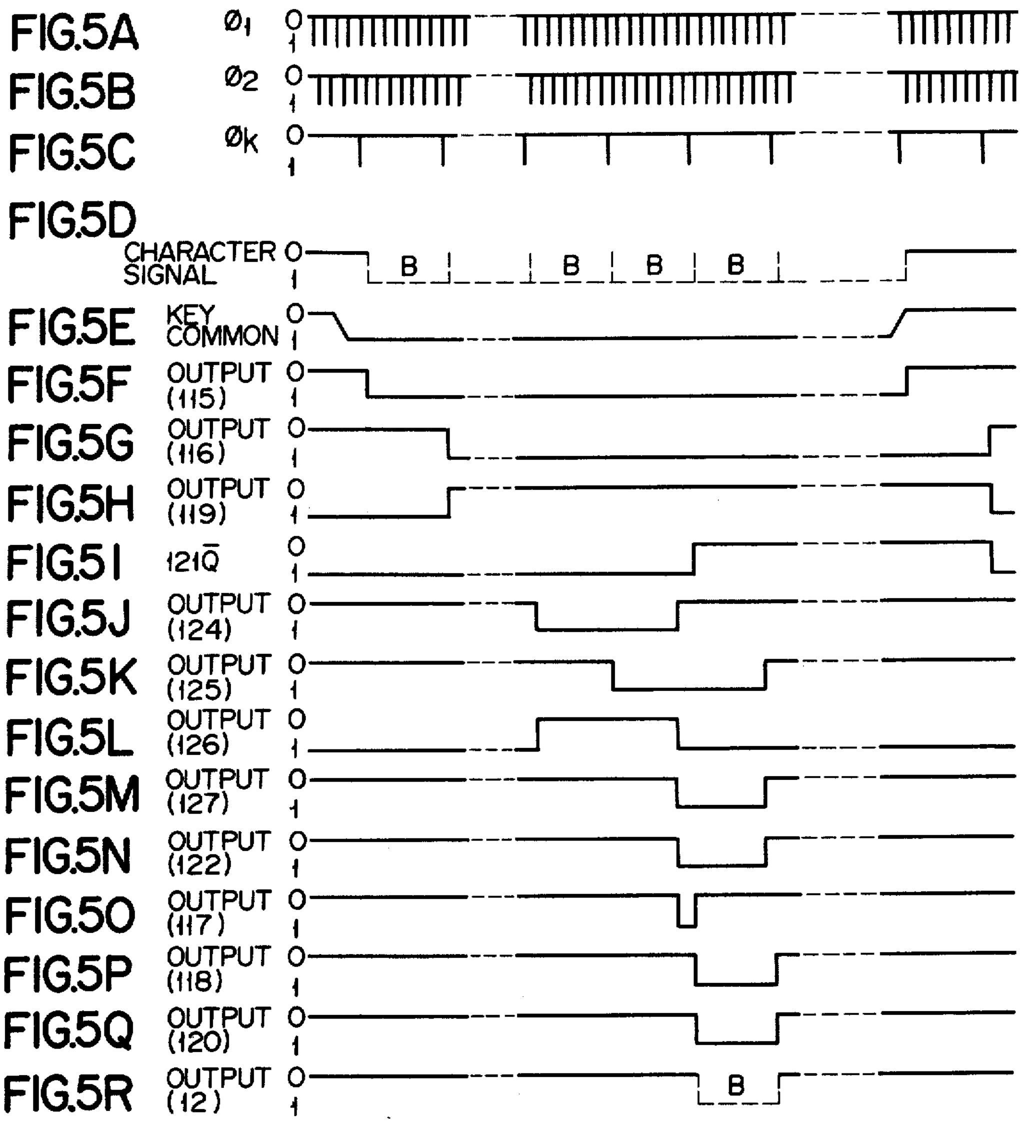

When the key of keyboard 11 bearing the letter B of the alphabet is depressed, then the B character signal shown in FIG. 5D, and the key-common signal, as described in reference to FIG. 15 in US Patent No. 3,509,329 "CALCULATOR", shown in FIG. 5B, are transmitted through lines 111, 112 to AND gate 12 and flip-flop circuit 115, respectively. As in the situation where the A character signal is transmitted, output signals from flip-flop circuits 115, 116 change from 0 to 1, as shown in FIGS. 5F, 5G. The output of inverter 119, connected as described before, is shown in FIG. 5H.

When the A character signal previously stored in registers 15, 16, 13 is circulated through registers 13 and 15, OR gates 124, 125, respectively connected to these registers, produce output signals of 1 in succession as shown in FIGS. 5J, 5K. The signal from gate 124 passes through an inverter 126 and is inverted as shown in FIG. 5L. As can be seen from FIG. 2, an AND gate 127 thus produces an output signal of 1 as shown in FIG. 5M, and the A character signal is stored in register 15 but not in register 13.

When the stored A character signal is shifted from register 15 to register 16, flip-flop circuit 123 is set to bring terminal $\overline{Q}$ to a state to generate an output signal of 0. OR gate 122 thus produces an output signal of 1, as shown in FIG. 5N, when AND gate 127 generates the output signal of 1. Since, at this time, flip-flop circuit 121 transmits an output signal of 1 as shown in FIG. 5I, at its terminal $\overline{Q}$, AND gate 117 receives three 1 input signals and transmits the output signal of 1 as shown in FIG. 5O. Circuit 118 generates the output signal of 1 as shown in FIG. 5P at a delayed time. Since AND gate 12 is open to pass the B character signal as shown in FIG. 5R, and gate 120 produces the output of 1 as shown in FIG. 5Q, flip-flop circuit 121 generates the output signal of 0 as shown in FIG. 5I at its terminal $\overline{Q}$.

Figure 6B:
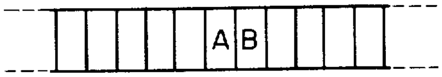

At this moment, the output signal of 0 is transmitted from AND gate 117 as shown in FIG. 5O. Thus, flip-flop circuit 118 is kept in a state to generate the output signal of 1 of a length of time corresponding to one character, or seven bits, and thereafter the output signal from circuit 118 changes its form to 0. Since at this moment AND gate 12 is closed, as shown in FIG. 5R, only one B character signal is stored in the registers in the position shown in FIG. 6B, that is, after the previously stored A character signal.

Figure 6C:

When the spacebar of keyboard 11 is operated, a signal instruction space is stored in the position shown in FIG. 6C, as in the situation of the B character signal, in succession to the last of the character signals already stored. When keyboard 11 is operated in the described order, i.e., the A key , the B key and the spacebar, then the character signals associated therewith are stored in registers 15, 16, 13 in that order, as shown in FIG. 6C.

The read-out of a series of character signals stored in the memory, and the printing of the word constituted by the letters represented by the signals, are carried out in the following manner. In regard to read-out, reference should be had to FIGS. 7A to 7S while the similar illustrations of FIGS. 8A to 8S relate to printing, the identical letters relating to the same circuit elements (e.g. FIGS. 7F, 8F both relate to register 13, and so on), each line identifying the temporal course of the element in question under the described conditions.

It might also be added that FIGS. 7A – 7C and 8A – 8C, as mentioned before, are repetitions of FIGS. 4A – 4K, repeated here only for purposes of comparison and correlation.

Figure 3:
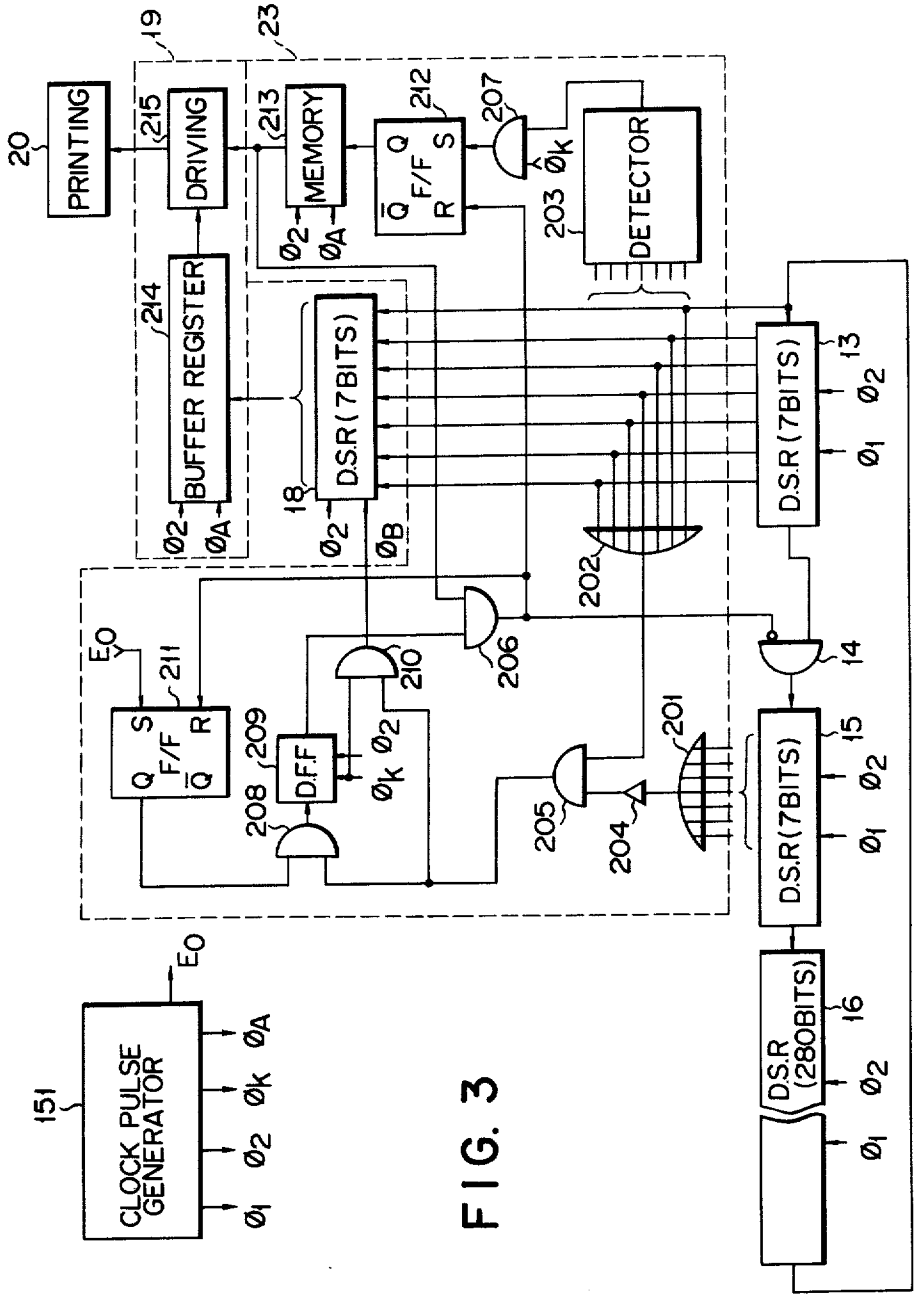
FIG. 3 is a detailed block diagram of "read-out" and "printing mechanism" portions of the apparatus of FIG. 1.
Figure 9A:
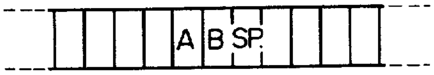

Referring to FIG. 3, character signals representing A and B letters and space as shown in FIG. 9A are stored in dynamic shift registers 15, 16, 13. These character signals are shifted by drive pulses $\phi_1$ and $\phi_2$ and circulated through these registers. After a predetermined period of time, these character signals are shifted to appear in registers 13 and 15 as shown in FIGS. 7F, 7G.

The memory unit of dynamic shift register arrangement of this invention is believed to be well known to those skilled in the art, for example as shown in U.S. Pat. No. 3,523,284 "INFORMATION CONTROL SYSTEM," so that no further description is believed to be necessary. Each register 15, 16 13 comprises a plurality of unit memories (so-called "bits") which are connected in series. The total number in the present invention is 280 + 7 + 7 = 294 bits, as mentioned earlier. The information stored in the DSR's 15, 16 13 is always urged by the clock-pulses $\phi_1$ and $\phi_2$, and naturally kept circularing within the memory.

Figure 9B:
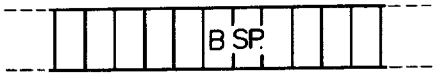
Figure 9C:
Figure 9D:
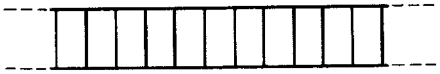
Figures 7A, 7B, 7C, 7D, 7E, 7F, 7G, 7H, 7I, 7J, 7K, 7L, 7M, 7N, 7O, 7P, 7Q, 7R, 7S:
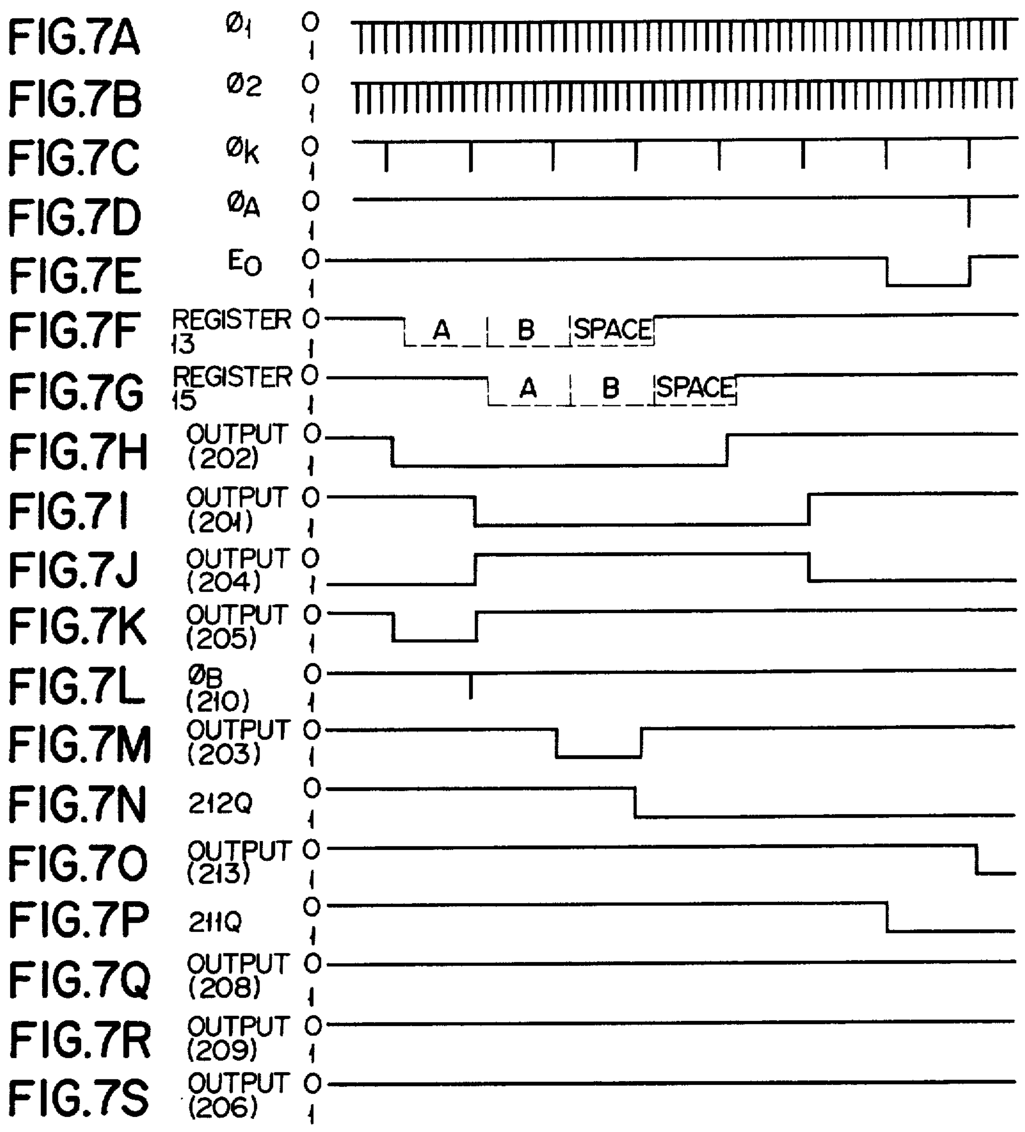
FIGS. 7A – 7S and 8A – 8S show the clock-pulse generator output and character signals in relation to time of the read-out and printing mechanism portions of the apparatus shown in FIG. 3.

If the information is stored and shifted as indicated in FIG. 9A and by an arrow in FIG. 1, respectively, the timing of the appearance of the information at registers 13, 15 is just as shown in FIGS. 7F and 7G. It should be noted in this connection that the clock-pulse $\phi_K$ shown in FIG. 7C helps shift the information by one character at a time. FIGS. 9B through 9D will be described somewhat later.

Output signals from OR gates 202, 201, which are connected to registers 13, 15, respectively, change from 0 to 1 as shown in FIGS. 7H, 7I. The output signal (see FIG. 7H) from OR gate 202 is transmitted to an AND gate 205 and the signal (FIG. 7I) from OR gate 201 to gate 205 through an inverter 204. The output signal from inverter 204 is of the form shown in FIG. 7J. The output terminal of AND gate 205 is connected to AND gates 208, 210. The output signal from AND gate 205 (see FIG. 7K) is of the form 1 when inverter 204 and OR gate 202 generate output signals 1, and is of the form 0 as shown in FIG. 7K when the outputs from gate 202 and inverter 204 are 0.

AND gate 205 thus transmits the output signal of 1 when shift register 13 stores any character signal, and register 15 contains no character signal, i.e., when register 13 stores the first A character signal of the plurality of stored character signals, depending of course on the number of characters in the word that is stored (this example only refers to two, A and B, for ease in understanding). The 1 output signal transmitted by AND gate 205 produces through AND gate 210 a write-in pulse $\phi_B$ shown in FIG. 7L (and also in FIG. 8L) in synchronism with the clock-pulse $\phi_K$. Write-in pulse $\phi_B$ causes the writein of the A character signal in dynamic shift register 18. Thereafter, the A signal is read out from register 18 in synchronism with read-out clock-pulse $\phi_2$.

When the character signals stored in registers 15, 16, 13 are further shifted in the direction of the indicated arrows, a word-positioning signal detector 203 detects a space signal consisting of specified codes shown in FIG. 7M. An output signal of 1 from detector 203 is then transmitted to a flip-flop circuit 212 through an AND gate 207 to set circuit 212 at the timing of clock-pulse $\phi_K$. The circuit 212 thus produces an output signal 1 shown in FIG. 7N at its terminal Q. Each time the character signals are circulated through registers 15, 16, 13 (four times under the afore-said condition), i.e., each time the clock-pulse $\phi_K$ is generated 168 times, clock-pulse generator 151 produces one character print-cycle clock-pulse $\phi_A$ generating for each four cycle of the contents of the register (13, 15, 16) shown in FIG. 7D (and also in FIG. 8D).

By way of explanation it should be added at this point that control unit 21, which was mentioned at the beginning of the description, includes the units 22 and 23 of FIGS. 2 and 3, respectively (but not so identified in FIG. 1 for the sake of clarity). OR gates 124, 125 in FIG. 2 are the same as gates 202, 201 in FIG. 3, respectively, and they are respectively associated with the DSR's 13, 15, as can readily be seen from the circuit diagrams. In FIG. 1 these connections are shown with respective (unnumbered) transmission lines.

A memory 213 stores the 1 output received from terminal Q of flip-flop circuit 212. Later, upon receipt of read-out clock-pulse $\phi_2$, memory 213 transmits an output signal of 1 as shown in FIG. 7O. The described elements constitute a unit generally designated by numeral 23, and forming part of unit 21, as just explained, together with unit 22.

Before proceeding with the description of unit 23, the construction of detector 203 might be elaborated upon. This circuit element is used to detect the word-positioning signals which are conventionally binary code signals (e.g. a space signal might be 11000000). Any detector that is responsive to such 7- or 8-element code signals (without or with a "parity bit") can be suitably employed as a detector. A decoder constituted by AND gates and a diode matrix are two typical examples.

In unit 23, a buffer register 214 of the earlier-described drive circuit or unit 19 is shown electrically interconnected with DSR 18 while another electrical connection lead from memory 213 of unit 23 to a drive circuit 215 of unit 19, as shown in FIG. 3. Register 214 stores a character signal transmitted from DSR 18 at the timing of the print-cycle clock-pulse $\phi_A$, and reads out the signal at the timing of the read-out clock-pulse $\phi_2$ and transmits it to drive circuit 215. Accordingly, the print-cycle clock-pulse $\phi_A$ is generated, eventually the complete word consisting of the letters represented by the character signals being printed by the printing mechanism.

Figures 8A, 8B, 8C, 8D, 8E, 8F, 8G, 8H, 8I, 8J, 8K, 8L, 8M, 8N, 8O, 8P, 8Q, 8R, 8S:
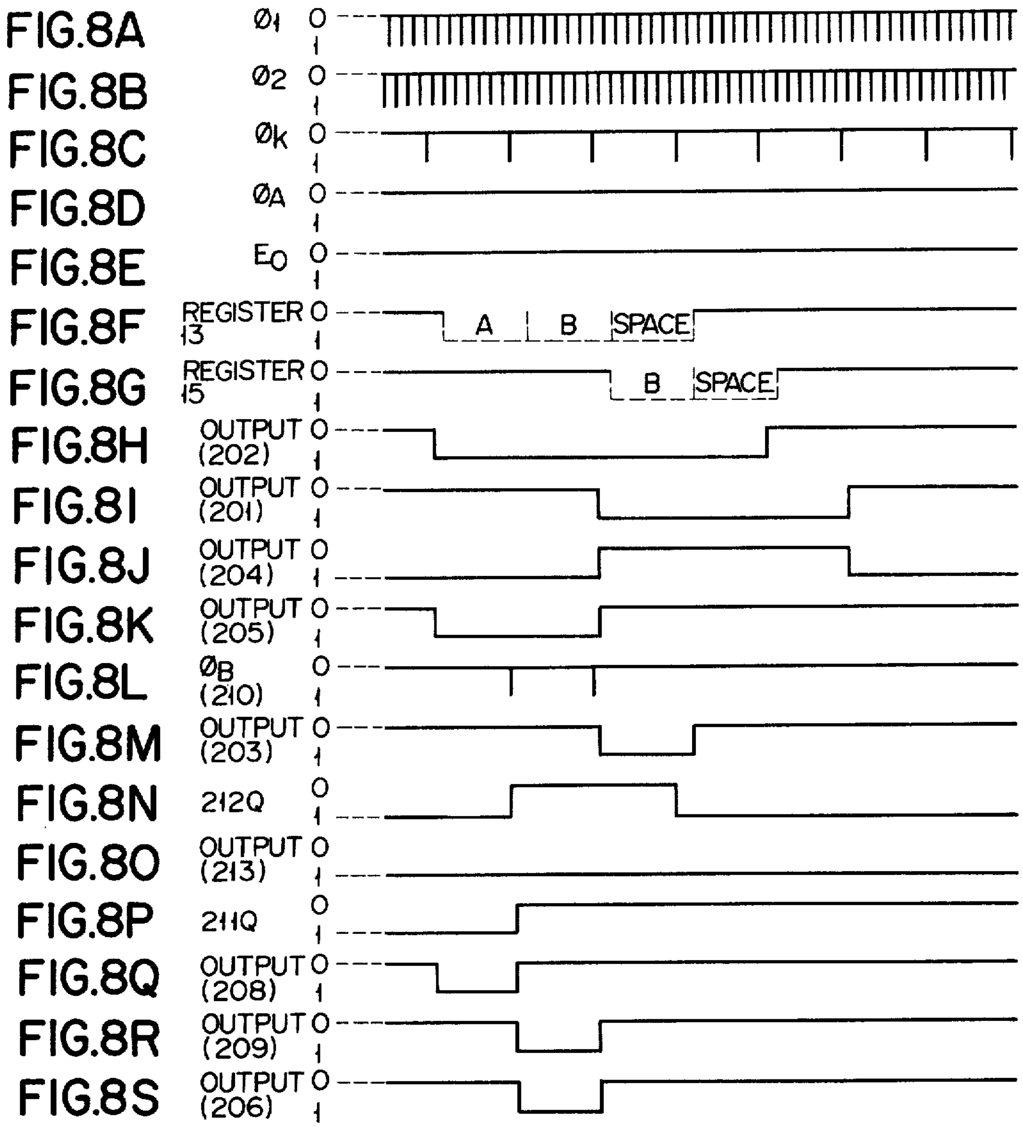

It should be noted that during the period of time corresponding to one character (seven bits), before the generation of the print-cycle clock-pulse $\phi_A$, clock-pulse generator 151 generates an end pulse $E_O$ shown in FIG. 7E (see also FIG. 8E). This end pulse sets a flip-flop circuit 211, causing it to generate an output signal 1 shown in FIG. 7P at its terminal Q. FIGS. 7Q, 7R and 7S are described as the counterparts: FIGS. 8Q to 8S.

When AND gate 205 generates the output 1 shown in FIG. 8K, AND gate 208 also transmits an output signal 1 as shown in FIG. 8Q, a delayed flip-flop circuit 209 then produces an output signal 1 as shown in FIG. 8R. Since, at this time, the output signal from memory 213 is of the form 1 as shown in FIG. 8O, an AND gate 206 receives two 1 input signals and produces an output signal 1 as shown in FIG. 8S. At this time, inhibit gate 14 is actuated to prevent the shift of character signal A from register 13 to register 15 and the signal A is deleted from said registers 13, 15 and 16. Flip-flop circuit 212 is reset and no output signal 1 produces as shown in FIG. 8N at its terminal Q. FIGS. 8F, H to J, M and P will be readily understood by referring to the earlier explanations given for the respective, similar FIGS 7F, H to J, M and P, respectively.

The 1 output signal from AND gate 206 resets flip-flop circuit 211, causing it to cease an output signal 1 at its terminal Q. As a result, AND gate 208 ceases an output signal 1 as shown in FIG. 8Q, and the output signal from delayed flip-flop circuit 209 does not generate. Thereafter the output signal from said AND gate 201 is changed to 0.

Since inhibit gate 14 is actuated during the time in which AND gate 206 continues to produce the output signal 1, for a period of time equal to one character (seven bits), the first of the character signals stored in registers 15, 16, 13, i.e., the A character signal, is prevented from being transmitted between registers 13, 15 as shown in FIG. 8G. As a result, these registers are cleared of the A character signal as shown in FIG. 9B.

After repetition of the above-described operation, the letter B is printed, and later the B character is also cleared from the registers as shown in FIG. 9C. After the subsequent space operation, the space signal is removed and registers 15, 16, 13 are cleared of the character signals previously stored therein as shown in FIG. 9B, thereby completing the printing of one word.

Referring now to FIG. 3, an explanation will be given on the word-by-word reading of words in the operation of the inventive device. Suppose all the characters forming a word, e.g. "CASIO", are fed into a circulating shift circuit or DSR, such as constituted by the units 15, 16, 13, and then kept shifted cyclically through the circuit, which is set to effect a single-character printing upon completion of every four cycles of the code shifting. When the first character of the exemplary word, C reaches DSR 13, one of the outputs thereof is supplied via OR circuit 202 to one of the gates of AND circuit 205. At this time DSR 15 is empty, and circuit 205 generates an output which is fed through inverter 204 to AND circuit 210 as a gate input. The latter receives an another gate input the clock-pulse $\phi_k$ obtained at every one-character printing, and generates an output as the write-in pulse $\phi_B$, thereby writing the character C from DSR 13 into DSR 18. Further, circuit 210 receives a read-out clock-pulse $\phi_2$ as will be clear from the foregoing, and stores the character C in buffer register 214.

Inhibit gate 14 allows the content of DSR 13 to be cyclically shifted to DSR 15 and then to DSR 16 since AND circuit 206 does not produce an output. The shifting continues, and in the meantime detector 203 detects a wordpositioning code, e.g. constituted by a space, which follows the last character 0 of the exemplary word CASIO. Upon detection of this code an output is produced by detector 203 which is fed to one of the gates of AND circuit 207. The latter receives at the same time at its other gate the clock-pulse $\phi_k$, obtained at every one-character printing, as explained before, and gives a set input to flip-flop circuit 212.

The output of the latter is fed into memory 213 by a clock-pulse $\phi_A$. Then the memory generates its output until it is fed with another similar pulse. This memory output is applied to driving circuit 215, as can be followed from FIG. 3. Upon being repeatedly fed with this output, circuit 215 actuates printing device 20, thereby printing character C as it was stored in register 214.

While this character is being printed, the output of memory 213 is fed to one gate of AND circuit 206. Meanwhile circuit 211 is set with a pulse $E_O$ immediately before the just mentioned memory 213 is set with the first clock-pulse $\phi_A$, and it produces an output which is supplied to the other gate of circuit 206 through AND circuit 208 and a line connecting it with delayed flip-flop circuit 209. Circuit 206 generates an output when it is supplied at one gate with an input from memory 213 and at the other with an input from circuit 211, and supplies the output to gate 14.

Upon receipt of the AND circuit 206 output, gate 14 prevents character C from being shifted from DSR 13 to 15. Consequently this character, already printed on the recording medium, can be said to have been eliminated from circulation in the DSR's 15, 16, 13. At the same time the 206 output is fed to both circuits 211, 212 as reset inputs. As a result inhibit gate 14 no longer receives any input and it opens to allow the remaining content of the shift-register unit to be shifted cyclically from DSR 13 to DSR 15.

Character C having thus been eliminated from the DSR unit, the next character, A, is stored in register 214, also through DSR 18. When a word-positioning code is shifted into DSR 13, detector 203 detects the code, whereby the printing of character A is initiated in device 20. Then A is also rubbed out from the circulating circuit, namely when gate 14 receives the output of AND circuit 206, as was explained before. Then the remaining content of the shift circuit, including "S-I-O", and the word-positioning code, is again cyclically shifted.

When all the characters of a word are sequentially printed and subsequently eliminated from the shift circuit, at the end the word-positioning code is detected by circuit 203 and stored in register 214. Although the code is transferred from this register to driving circuit 215, it is not printed since it is intercepted by the decoder portion of circuit 215. It might be added that the binary combination used for the word-positioning code is not of the arrangement that can be passed to the printing unit so that this "function code" by its arrangement proper is excluded from the printable character codes or functions, such as a space, tab or other "function" of the typewriter.

As explained above, the characters of each word are fed into the shift circuit (including the 15, 16, 13), sequentially stored in buffer register 214 if DSR 15 is empty when the characters reach DSR 13, sequentially printed when a word-positioning code is detected, and eventually sequentially eliminated from the DSR: all this results in a word-by-word printing of the inputted, stored and circulated information.

Merely for the sake of completeness, a short explanation is being added relative to the writing-in operation, to supplement the above reading-out procedure (although in reverse order). This refers of course to FIG. 2 which, except for the showing of the keyboard, is entirely part of unit 21 (while FIG. 3 also showed portions of units 19, 20 with transmission lines leading to circuits of unit 23). When the characters forming a word are to enter DSR's 15, 16, 13, a separate clear key 113, as described earlier, can be operated on keyboard 11, to supply an input to inhibit gate 14. If a wrong character was fed by error in reading or typing, gate 14 — now supplied with an input clears not only the wrong character but actually all the characters fed before the wrong one so that the word may thereafter enter the DSR's correctly. This "word-by-word clearance" is a most useful feature of the present invention, constituting as it does a direct result of the characteristics of the writing-in operation in the word-by-word printing according to the present invention.

While only several exemplary embodiments of the inventive control device for printing apparatus have been shown and described, it will be obvious to those persons skilled in the art that many changes and modifications may be made thereunto without departing from the spirit and scope of the invention.

What is claimed is:

1. A printing control device for a printing apparatus, comprising, in combination:

input means for feeding character signals and word positioning signals to distinguish one word from another, each word being constituted by at least one character signal;

memory means coupled to said input means for storing the character signals in the same predetermined order as they are applied to said input means;

means for detecting the word positioning signals each time they are fed from said input means;

control means for reading out the character signals in a manner of word-by-word from said memory means, in response to the detected word positioning signals in the same order as they are stored in said memory means;

printer driving means driven by the outputs fed from said detecting means; and printer means driven by said driving means for printing characters in a manner of word-by-word, including in each word the characters corresponding to the respective character signals read out by said control means in the predetermined order.

2. The printing control device according to claim 1, wherein said memory means includes a dynamic shift register including a plurality of memory units, each of which has a memory capacity of one character, forming a circular loop, and storing the character signals in series; and said control means includes a detector which detects the first one of the character signals stored in series in said memory means by selectively sensing the presence and absence of the character signals at both of any two adjacent ones of said memory units, and means for eliminating, after completion of the character printing, the character signals that have been detected by said detector and read out from said memory means.

3. A printing control device for a printing apparatus, comprising, in combination:

input means for feeding character signals and word positioning signals to distinguish one word from another, each word being constituted by at least one character signal;

memory means coupled to said input means for storing the character signals and the word positioning signals in the same predetermined order as they are applied to said input means;

means coupled to said memory means for detecting the word positioning signals each time they are fed to said memory means;

control means for reading out the character signals in a manner of word-by-word, in response to the word positioning signals, said control means including means for reading out the character signals from said memory means in the same order as they are stored in said memory means, and means for eliminating the character signals in the same order as they are read out from said memory means;

printer driving means driven by the outputs fed from said control means; and printer means driven by said driving means for printing characters in a manner of word-by-word, including in each word the characters corresponding to the respective character signals read out by said control means in the predetermined order.

* * * * *